(12) United States Patent
Wakamatsu et al.

(10) Patent No.: US 6,640,178 B2
(45) Date of Patent: Oct. 28, 2003

(54) PROCESS FOR ESTIMATING DRIVE TORQUE IN VEHICLE

(75) Inventors: Kiyoshi Wakamatsu, Wako (JP); Ryuji Asada, Wako (JP); Akihiro Iwazaki, Wako (JP); Shinji Okuma, Wako (JP); Tatsuhiro Tomari, Wako (JP); Masakatsu Hori, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 12 days.

(21) Appl. No.: 09/987,704

(22) Filed: Nov. 15, 2001

(65) Prior Publication Data

US 2002/0099490 A1 Jul. 25, 2002

(30) Foreign Application Priority Data

Nov. 15, 2000 (JP) ......................... 2000-347496

(51) Int. Cl.[7] .................... B60K 41/12; B60K 17/06
(52) U.S. Cl. ...................... 701/51; 701/69; 477/107
(58) Field of Search .................. 701/51, 69; 477/107, 477/109, 110, 115, 155, 120

(56) References Cited

U.S. PATENT DOCUMENTS

| | | | | |
|---|---|---|---|---|
| 4,909,103 A | * | 3/1990 | Morimoto | 477/38 |
| 5,065,319 A | * | 11/1991 | Iwatsuki et al. | 701/101 |
| 5,510,982 A | * | 4/1996 | Ohnishi et al. | 701/55 |
| 5,688,207 A | * | 11/1997 | Uchida et al. | 477/155 |
| 5,871,416 A | * | 2/1999 | Sawada et al. | 477/47 |
| 6,007,452 A | * | 12/1999 | Sawada et al. | 477/45 |
| 6,169,949 B1 | * | 1/2001 | Sato | 701/51 |
| 6,183,390 B1 | * | 2/2001 | Koga et al. | 477/37 |
| 6,379,283 B1 | * | 4/2002 | Cullen | 477/110 |

FOREIGN PATENT DOCUMENTS

JP 10-181564 7/1998

* cited by examiner

*Primary Examiner*—Tan Q. Nguyen
*Assistant Examiner*—Dalena Tran
(74) *Attorney, Agent, or Firm*—Arent Fox Kintner Plotkin & Kahn

(57) ABSTRACT

In a vehicle in which a torque generated in an engine is transmitted to driven wheels through a torque converter and an automatic transmission, when a speed ratio e in the torque converter is equal to or larger than a predetermined value (e.g., 0.85), and the accuracy of estimating a capacity $\tau$ of the torque converter is low, an estimated engine torque Ti is multiplied by a torque ratio k of the torque converter to estimate a drive torque Td. When the speed ratio e in the torque converter is smaller than the predetermined value, and a response lag is produced in the transmission of the engine torque, a drive torque Td is estimated from an engine rotational sped Ne and the speed ratio e in the torque converter. During shifting of the automatic transmission, a drive torque Td is estimated from a wheel speed V. Thus, a correct drive torque can be estimated.

7 Claims, 13 Drawing Sheets

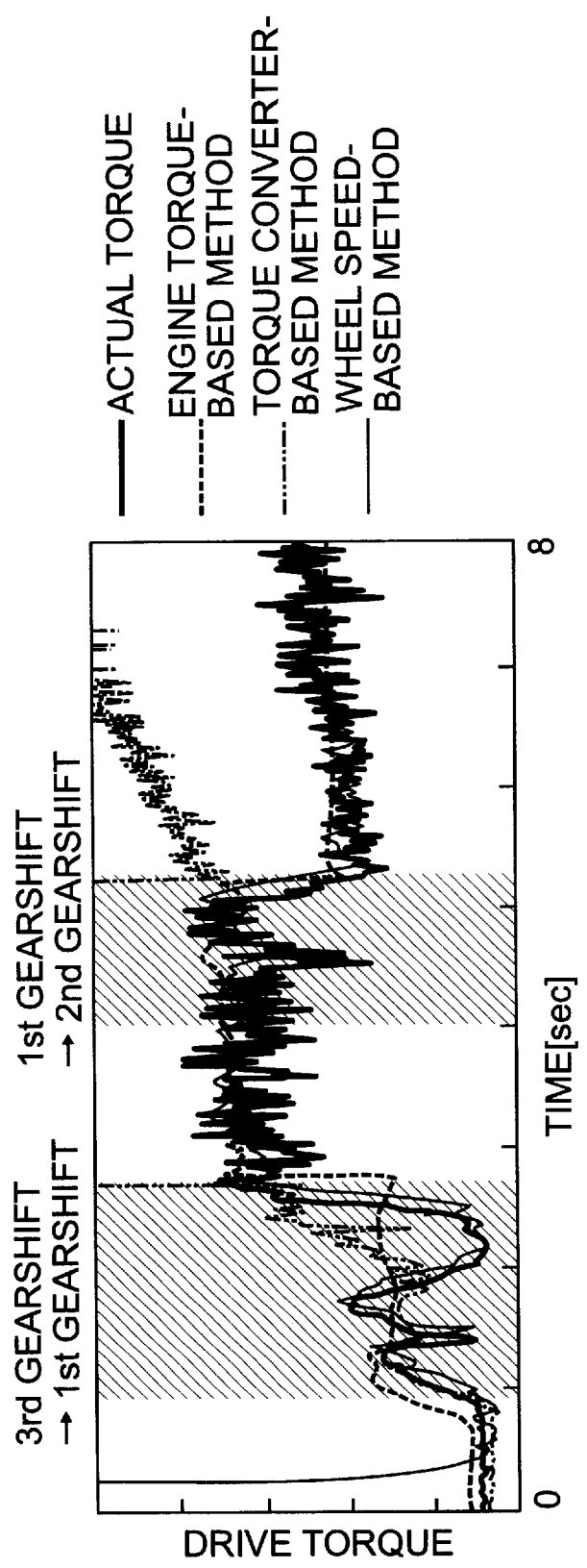

PROCESS FOR ESTIMATING DRIVE TORQUE IN VEHICLE

BACKGROUND OF THE INVENTION

1. Field of the Invention

The present invention relates to a vehicle in which a torque generated in an engine is transmitted to driven wheels through a torque converter and an automatic transmission, and particularly, to a process for estimating such a drive torque.

2. Description of the Related Art

A technique for estimating a drive torque transmitted from an engine through an torque converter and an automatic transmission to driven wheels in a vehicle including a torque converter is known from Japanese Patent Application Laid-open No.10-181564, which technique comprises multiplying an engine torque (torque input to the torque converter) by a torque ratio of the torque converter to calculate a torque output from the torque converter, and multiplying the torque output from the torque converter by a gear ratio of the transmission to calculate a drive torque.

Another example of the above-described technique for estimating a drive torque is known from Japanese Patent Application No.11-256831, which technique comprises multiplying a vehicle body acceleration resulting from the time-differentiation of a wheel speed by a vehicle body mass to calculate a vehicle body-driving force, and multiplying the vehicle body-driving force by a dynamic load radius to estimate a drive torque.

The former technique suffers from a problem that in a region in which a speed ratio in the torque converter is smaller (namely, in a region in which the slipping of the torque converter is larger), the accuracy of estimation of the drive torque is reduced due to a time lag till the transmission of the engine torque to the driven wheels. The latter technique suffers from a problem that the accuracy of estimation of the drive torque is reduced, because the vehicle body acceleration is influenced by a gravity acceleration during traveling of the vehicle up and down a slope.

SUMMARY OF THE INVENTION

Accordingly, it is an object of the present invention to ensure that a correct drive torque can be always estimated irrespective of an operational state of the engine and an operational state of the vehicle.

To achieve the above object, according to a first aspect and feature of the present invention, there is provided a process for estimating a drive torque in a vehicle in which a torque generated in an engine is transmitted to driven wheels through a torque converter and an automatic transmission, the process comprising the step of multiplying an estimated engine torque Ti by a torque ratio k of the torque converter to estimate a drive torque Td, when a speed ratio e in the torque converter is equal to or larger than a predetermined value, and estimating a drive torque Td from an engine rotational speed Ne and the speed ratio e in the torque converter, when the speed ratio e in the torque converter is smaller than the predetermined value.

With the above feature, when the speed ratio e in the torque converter is equal to or larger than the predetermined value, and a capacity $\tau$ of the torque converter cannot be estimated accurately, the estimated engine torque is multiplied by the torque ratio k of the torque converter to estimate the drive torque Td. When the speed ratio e in the torque converter is smaller than the predetermined value, and the rising of the engine torque is earlier than the rising of the drive torque Ts, the drive torque Td is estimated from the engine rotational speed Ne and the sped ratio e in the torque converter. Therefore, a correct drive torque can be always estimated irrespective of the magnitude of the speed ratio e in the torque converter.

According to a second aspect and feature of the present invention, in addition to the first feature, there is provided a process for estimating a drive torque in a vehicle in which, when the speed ratio e in the torque converter is equal to or larger than the predetermined value, the torque ratio k of the torque converter is calculated from the speed ratio e in the torque converter, and the estimated engine torque Ti is multiplied by the torque ratio k of the torque converter to estimate the drive torque Td.

With the above feature, when the speed ratio e in the torque converter is equal to or larger than the predetermined value, and the capacity $\tau$ of the torque converter cannot be estimated accurately, the torque ratio k of the torque converter is calculated from the speed ratio e in the torque converter, and the estimated engine torque Ti is multiplied by the torque ratio k of the torque converter to estimate the drive torque Td. Therefore, the drive torque Td can be estimated correctly.

According to a third aspect and feature of the present invention, in addition to the first feature, when the speed ratio e in the torque converter is smaller than the predetermined value, the torque Ti input to the torque converter is calculated from the engine rotational speed Ne and the capacity $\tau$ of the torque converter, the torque ratio k of the torque converter is calculated from the speed ratio e in the torque converter, and the torque Ti input to the torque converter is multiplied by the torque ratio k of the torque converter to estimate the drive torque Td.

With the above feature, when the speed ratio e in the torque converter is smaller than the predetermined value, and the rising of the engine torque is earlier than the rising of the drive torque Td, the torque Ti input to the torque converter is calculated from the engine rotational speed Ne and the capacity $\tau$ of the torque converter; the torque ratio k of the torque converter is calculated from the speed ratio e in the torque converter, and the torque Ti input to the torque converter is multiplied by the torque ratio k of the torque converter to estimate the drive torque Td. Therefore, the drive torque Td can be estimated correctly.

According to a fourth aspect and feature of the present invention, in addition to any of the first, second and third features, the predetermined value of the speed ratio e in the torque converter is 0.85.

With the above feature, techniques for estimating the drive torque Td is changed from one to the other between when the speed ratio e in the torque converter is equal to or larger than 0.85 and when the speed ratio e in the torque converter is smaller than 0.85. Therefore, the drive torque Td can be estimated correctly over a wide range of the speed ratio e.

According to a fifth aspect and feature of the present invention, in addition to the first feature, during shifting of the automatic transmission, the drive torque Td is estimated from a vehicle speed V.

With the above feature, during the shifting of the automatic transmission in which the driven wheels are disconnected from the engine and the torque converter, the drive torque Td is estimated from the wheel speed V. Therefore, even if neither of the engine torque-based method nor the torque converter-based method can be used, the drive torque can be estimated.

According to a sixth aspect and feature of the present invention, in addition to any of the first to fifth features, the estimated drive torque Td is used to calculate a drive distribution torque between the left and right driven wheels.

With the above feature, the drive distribution torque between the left and right driven wheels is calculated based on the estimated drive torque Td, and hence, it can be calculated accurately.

The above and other objects, features and advantages of the invention will become apparent from the following description of the preferred embodiment taken in conjunction with the accompanying drawings.

BRIEF DESCRIPTION OF THE DRAWINGS

FIGS. 1 to 13 show an embodiment of the present invention.

FIG. 1 is an illustration of the entire arrangement of a vehicle provided with a drive force-distributing device;

FIG. 2 is a diagram showing the structure of the drive force-distributing device;

FIG. 3 is a diagram showing the operation of the drive force-distributing device during clockwise turning of the vehicle;

FIG. 4 is a diagram showing the operation of the drive force-distributing device during counterclockwise turning of the vehicle;

FIG. 5 is a block diagram showing the circuit arrangement of an electronic control unit;

FIG. 6 is a diagram showing the arrangement of an engine torque-based drive torque estimating means;

FIG. 7 is a diagram showing the arrangement of a torque converter-based drive torque estimating means;

FIG. 8 is a diagram showing the arrangement of a wheel speed-based drive torque estimating means;

FIG. 9 is a graph showing the relationship between the torque ratio k, the capacity τ as well as k×τ and the speed ratio e in a torque converter;

FIG. 10 is a graph for comparing the drive torque estimated by a simple torque converter-based method and the measured value with each other;

FIG. 11 is a diagram for explaining a technique for determining a turning drag torque;

FIG. 12 is a graph for comparing the drive torque estimated by an engine torque-based method and the drive torque estimated by the torque converter-based method with the measured value during non-shifting of an automatic transmission; and FIG. 13 is a graph for comparing the drive torques estimated by the above-described methods with the measured value.

DESCRIPTION OF THE PREFERRED EMBODIMENT

The present invention will now be described by way of an embodiment of the present invention with reference to the accompanying drawings.

Figure 1:
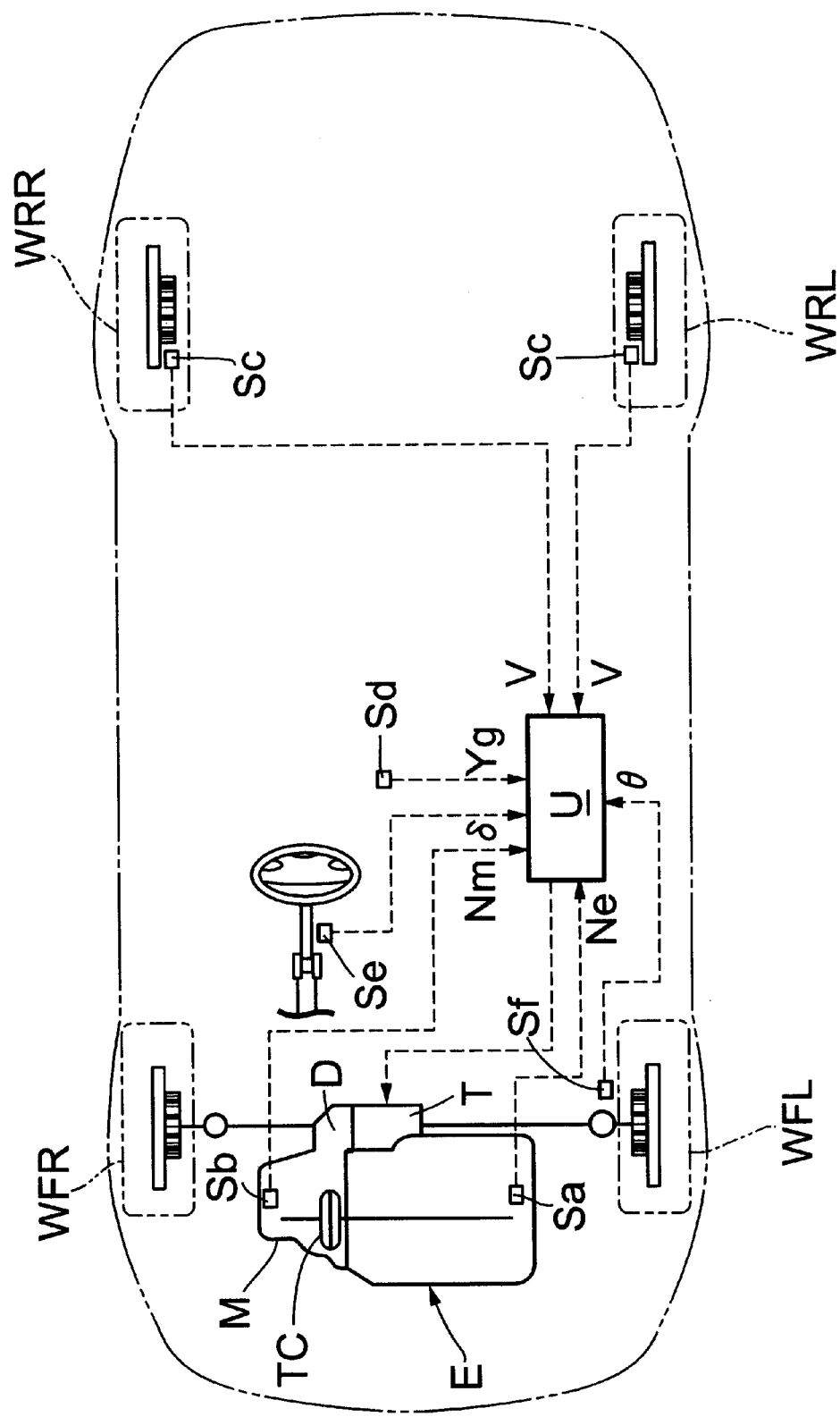
Figure 2:
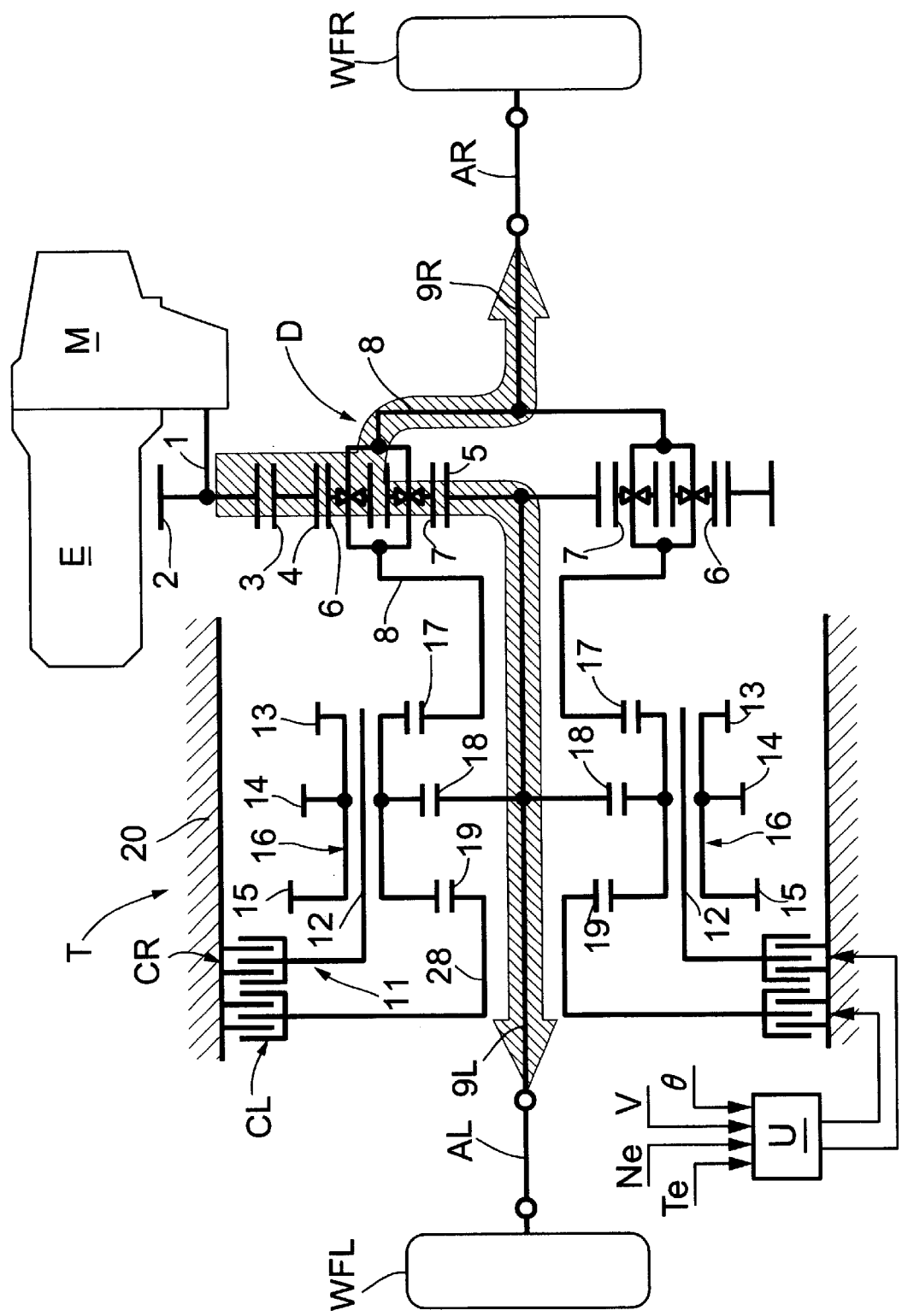

Referring to FIGS. 1 and 2, an automatic transmission M is connected through a torque converter TC to a right end of an engine E mounted horizontally at a front portion of a vehicle body of a front engine and front drive vehicle, and a drive force distributing device T is disposed in the rear of the engine E. A left front wheel WFL and a right front wheel WFR are connected to a left drive shaft AL and a right drive shaft AR, which extend leftwards and rightwards from a left end and a right end of the drive force distributing device T, respectively.

The drive force distributing device T includes a differential D to which a drive force is transmitted from an external gear 3 meshed with an input gear 2 provided on an input shaft 1 extending from the automatic transmission M. The differential D comprises a planetary gear mechanism of a double-pinion type, and includes a ring gear 4 formed integrally with the external gear 3, a sun gear 5 disposed coaxially within the ring gear 4, and a planetary carrier 8 on which an outer planetary gear 6 meshed with the ring gear 4 and an inner planetary gear 7 meshed with the sun gear 5 are carried in meshed states. In the differential D, the ring gear 4 functions as an input element, and the sun gear 5 functioning as one of output elements is connected to the left front wheel WFL through a left output shaft 9L, while the planetary carrier 8 functioning as the other output element is connected to the right front wheel WFR through a right output shaft 9R.

A carrier member 11 is rotatably supported on an outer periphery of the left output shaft 9L and includes four pinion shafts 12 disposed at distances of 90° in a circumferential direction, and triple-pinion members 16 each having first, second and third pinions 13, 14 and 15 integrally formed thereon are rotatably supported on the pinion shafts 12, respectively.

A first sun gear 17, which is rotatably supported on the outer periphery of the left output shaft 9L and meshed with the first pinion 13, is connected to the planetary carrier 8 of the differential D. A second sun gear 18 fixed to the outer periphery of the left output shaft 9L is meshed with the second pinion 14. Further, a third sun gear 19 rotatably supported on the outer periphery of the left output shaft 9L is meshed with the third pinion 15.

Numbers of teeth of the first pinion 13, the second pinion 14, the third pinion 15, the first sun gear 17, the second sun gear 18 and the third sun gear 19 are as follows:

Number Zb of first pinion 13=17

Number Zd of second pinion 14=17

Number Zf of third pinion 15=34

Number Za of first sun gear 17=32

Number Zc of second sun gear 18=28

Number Ze of third sun gear 19=32

The third sun gear 19 is capable of being coupled to a casing 20 through a left hydraulic clutch CL, so that the rotational speed of the carrier member 11 is increased by the engagement of the left hydraulic clutch CL. The carrier member 11 is capable of being coupled to the casing through a right hydraulic clutch CR, so that the rotational speed of the carrier member 11 is decreased by the engagement of the right hydraulic clutch CR. The right and left hydraulic clutches CR and CL are controlled by an electronic control unit U including a microcomputer.

Figure 5:
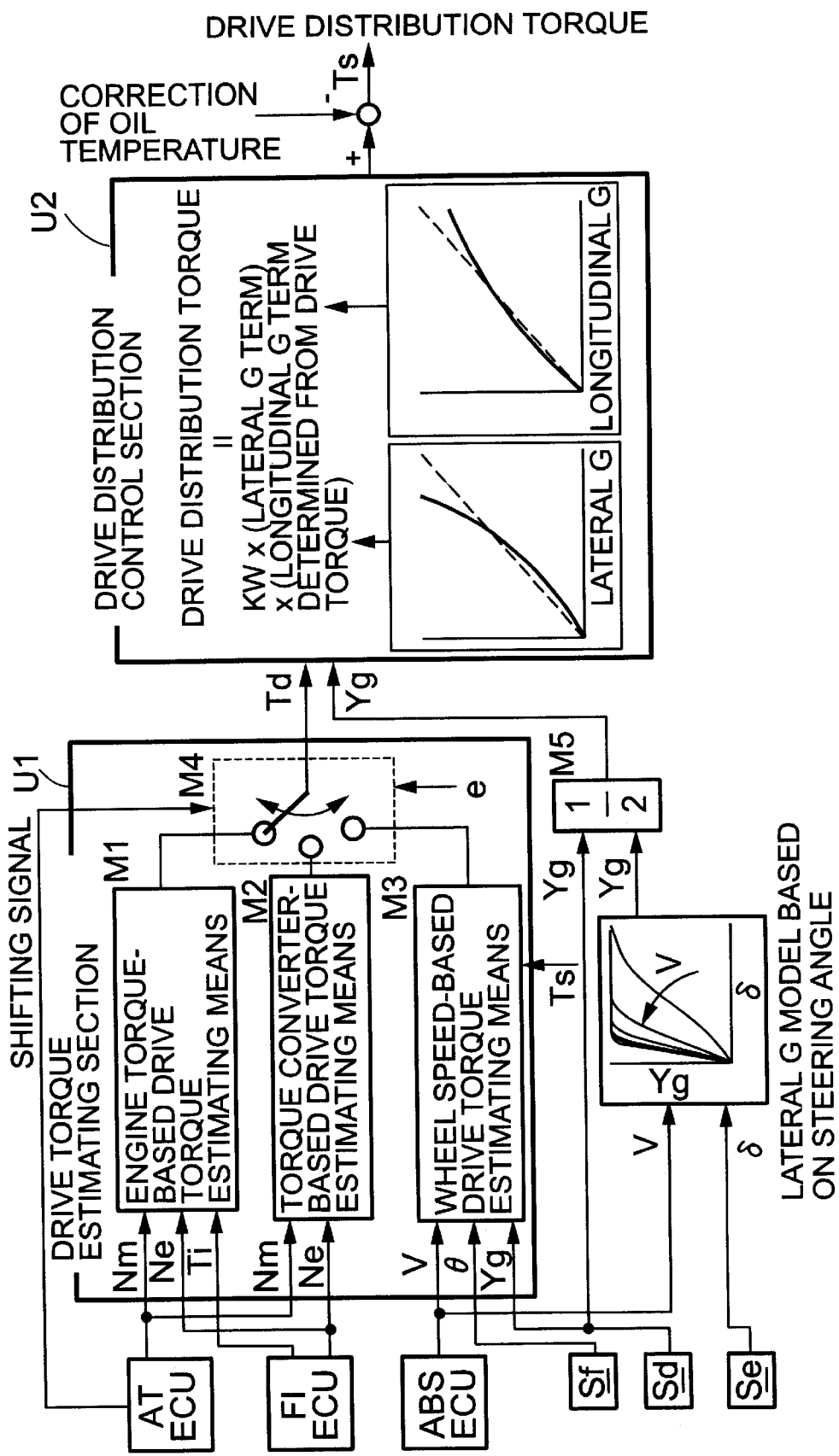

As shown in FIGS. 1 and 5, input to the electronic control unit U are signals from an engine rotational-speed detecting means Sa for detecting a rotational speed Ne of the engine, a main shaft rotational-speed detecting means Sa for detecting a rotational speed Nm of a main shaft of the automatic transmission M, a wheel speed detecting means Sc for detecting a wheel speed (namely, a vehicle speed) V of rear wheels WRL and WRR which are follower wheels, a lateral acceleration detecting means Sd for detecting a lateral acceleration of the vehicle, a steering-angle detecting means Se for detecting a steering angle δ of a steering wheel, and a steered-angle detecting means Sf for detecting a steered angle θ of the front wheels WFL and WFR. The electronic control unit U is adapted to subject the signal from the detecting means Sa to Sf to a calculation based on a predetermined program to control the left and right hydraulic clutches CL and CR.

The operation of the drive force-distributing device T will be described below.

During straight traveling of the vehicle, both of the right and left hydraulic clutches CR and CL are brought into a non-engaged state by a command from the electronic control unit U. This releases the restraint of the carrier member 11 and the third sun gear 19, so that all of the left drive shaft 9L, the right drive shaft 9R, the planetary carrier 8 of the differential D and the carrier member 11 are rotated in unison with one another. At this time, a torque from the engine E is transmitted through the differential D equally to the left and right front wheels WFL and WFR.

Figure 3:
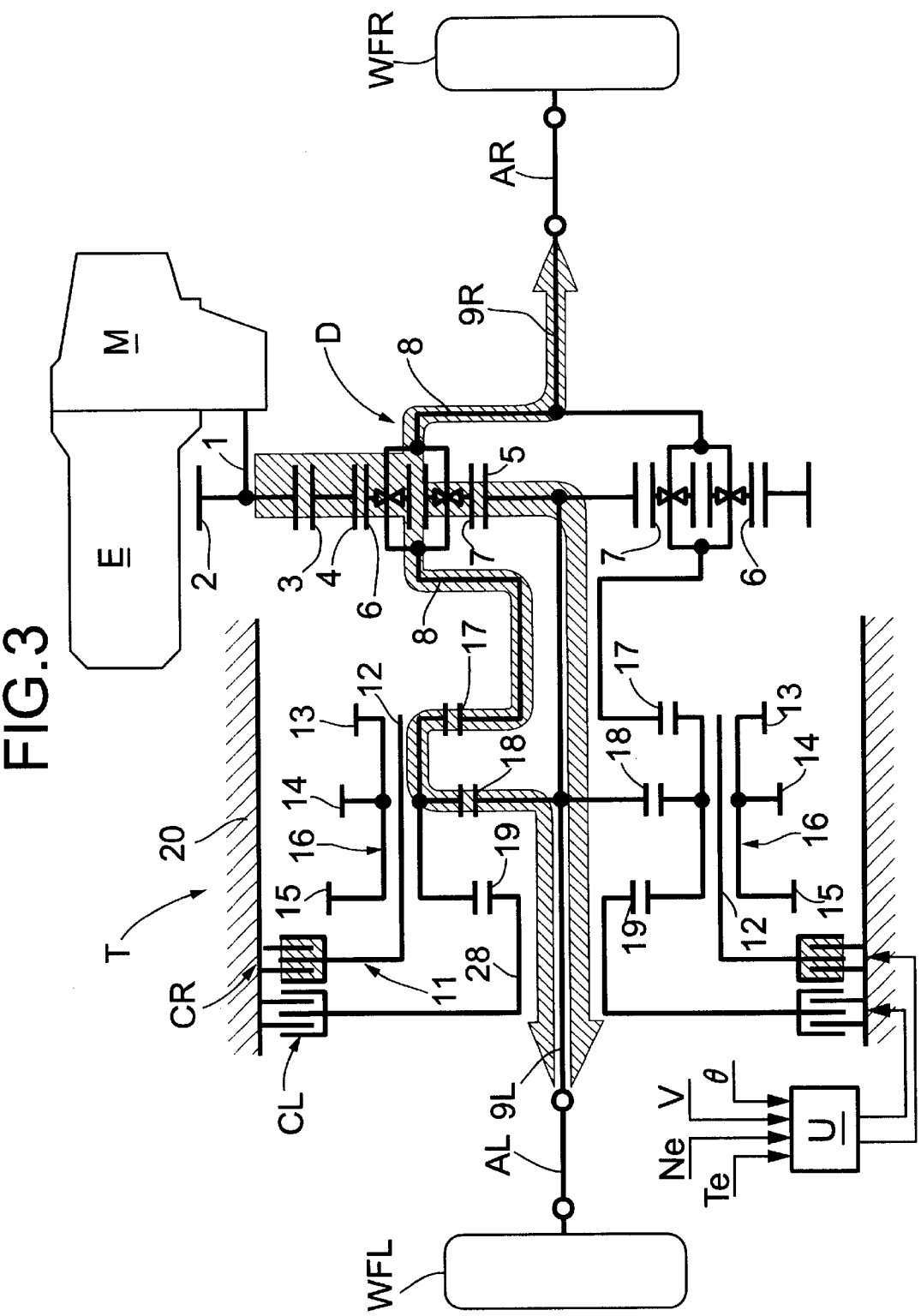

Now, when the vehicle is turned clockwise, while being accelerated, the right hydraulic clutch CR is brought into its engaged state by the command from the electronic control unit U, as shown in FIG. 3, thereby coupling the carrier member 11 to the casing 20 to stop it. At this time, the left output shaft 9L integral with the left front wheel WFL and the right output shaft 9R integral with the right front wheel WFR (i.e., the planetary carrier 8 of the differential) have been connected to the each other through the second sun gear 18, the second pinion 14, the first pinion 13 and the first sun gear 17 and hence, the rotational speed NL of the left front wheel WFL is increased relative to the rotational speed NR of the right front wheel WFR according to a relation shown in the following equation:

$$NL/NR = (Zd/Zc) \times (Za/Zb) = 1.143$$

When the rotational speed NL of the left front wheel WFL is increased relative to the rotational speed NR of the right front wheel WFR in the above manner, a portion of the torque of the right front wheel WFR which is an inner wheel as viewed during turning of the vehicle can be transmitted to the left front wheel WFL which is an outer wheel as viewed during turning of the vehicle, as shown by hatched arrows in FIG. 3.

If the engagement force of the right clutch CR is regulated properly to decrease the rotational speed of the carrier member 11 instead of stopping the carrier member 11 by the right hydraulic clutch CR, the rotational speed NL of the left front wheel WFL can be increased relative to the rotational speed NR of the right front wheel WFR in accordance with such decrease in rotational speed of the carrier member 11, whereby a torque of desired magnitude can be transmitted from the right front wheel WFR which is the inner wheel to the left front wheel WFL which is the outer wheel.

Figure 4:
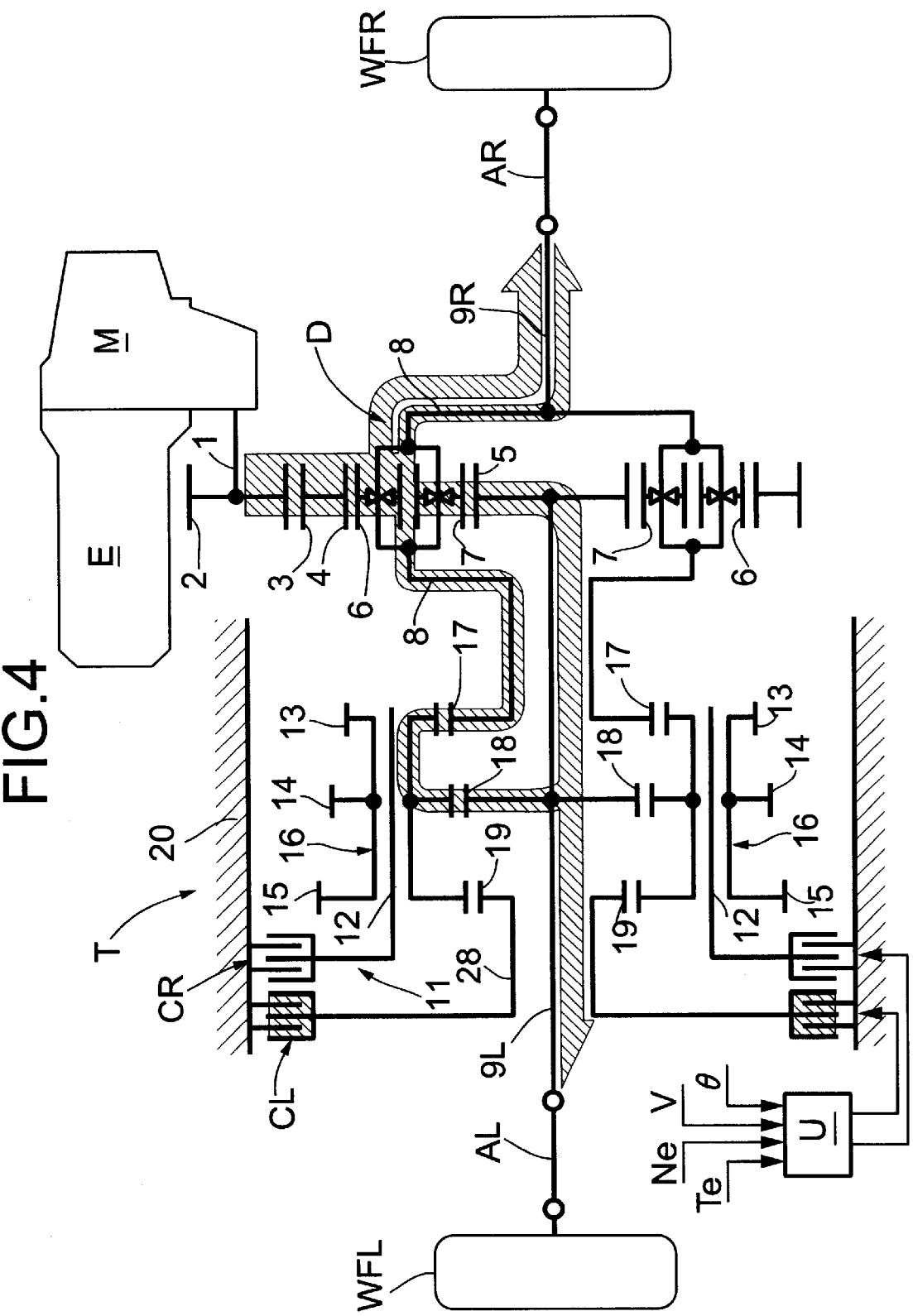

On the other hand, when the vehicle is turned counterclockwise, while being accelerated, the left hydraulic clutch CL is brought into its engaged state by the command from the electronic control unit U, as shown in FIG. 4, thereby coupling the third pinion 15 to the casing 20 through the third sun gear 19. As a result, the rotational speed of the carrier member 11 is increased relative to the rotational speed of the left output shaft 9L, whereby the rotational speed NR of the right front wheel WFR is increased relative to the rotational speed NL of the left front wheel WFL according to a relationship represented by the following equation:

$$NR/NL = \{1 - (Ze/Zf) \times (Zb/Za)\} \div$$
$$\{1 - (Ze/Zf) \times (Zd/Zc)\}$$
$$= 1.167$$

When the rotational speed NR of the right front wheel WFR is increased relative to the rotational speed NL of the left front wheel WFL in the above manner, a portion of a torque of the left front wheel WFL which is an inner wheel as viewed during traveling of the vehicle can be transmitted to the right front wheel WFR which is an outer wheel as viewed during traveling of the vehicle, as shown by hatched arrows in FIG. 4. Even in this case, if the engagement force of the left hydraulic clutch CL is regulated properly to increase the rotational speed of the carrier member 11, the rotational speed NR of the right front wheel WFR can be increased relative to the rotational speed NL of the left front wheel WFL in accordance with such increase in rotational speed of the carrier member 11, whereby a torque of desired magnitude can be transmitted from the left front wheel WFL which is the inner wheel to the right front wheel WFR which is the outer wheel.

Thus, during turning and acceleration of the vehicle, a torque larger than that to the inner wheel can be transmitted to the outer wheel to enhance the turning performance. During traveling of the vehicle at a high speed, the torque transmitted to the outer wheel can be decreased, as compared with that during traveling of the vehicle at a medium or low speed, or the torque can be transmitted conversely from the outer wheel to the inner wheel to enhance the stable performance of travel.

As can be seen from comparing of the equation of (NL/NR) with the equation of (NR/NL), the rate (about 1.143) of increase in rotational speed of the left front wheel relative to the rotational speed of the right front wheel and the rate (about 1.167) of increase in rotational speed of the right front wheel relative to the rotational speed of the left front wheel can be substantially equalized to each other by setting the numbers of teeth of the first pinion 13, the second pinion 14, the third pinion 15, the first sun gear 17, the second sun gear 18 and the third sun gear 19 at the above-described values.

As shown in FIG. 5, the electronic control unit U has a drive torque estimating section U1, which includes an engine torque-based drive torque estimating means M1, a torque converter-based drive torque estimating means M2, a wheel speed-based drive torque estimating means M3, and a selecting means M4 for selecting any of outputs from the three estimating means M1, M2 and M3. A main shaft rotational-speed Nm from an automatic transmission ECU, an engine rotational speed Ne from a fuel injection ECU and an engine torque Ti are input to the engine torque-based drive torque estimating means M1. The main shaft rotational-speed Nm from a automatic transmission ECU and the engine rotational speed Ne from the fuel injection ECU are input to the torque converter-based drive torque estimating means M2. A wheel speed, i.e., a vehicle speed V from an antilock brake system ECU, a lateral acceleration Yg from the lateral acceleration detecting means Sd and a steered angle θ from the steered-angle detecting means Sfare input to the wheel speed-based drive torque estimating means M3. A shifting signal from the automatic transmission ECU and a speed ratio e in the torque converter TC, which will be described hereinafter, are input to the selecting means M4.

A lateral acceleration Yg is searched in a map based on the wheel speed, namely, the vehicle speed from the antilock brake system ECU and a steering angle δ detected by the steering angle detecting means Se. An average value of the lateral acceleration Yg searched in the map and a lateral acceleration Yg detected directly by the lateral acceleration detecting means Sd is calculated in an average value calculating means M5.

Any of three drive torques Td estimated by the engine torque-based drive torque estimating means M1, the torque converter-based drive torque estimating means M2 and the wheel speed-based drive torque estimating means M3 of the drive torque estimating section U1 is selected by the selecting means M4. In a drive distribution control section U2 of the electronic control unit U, to which the estimated drive torque Td and the lateral acceleration Yg calculated in the average value calculating means M5 are input, a drive distribution torque Ts during acceleration of the vehicle is calculated by multiplying a lateral acceleration term searched in the map from the lateral acceleration Yg and a longitudinal acceleration term searched in the map from the drive torque Td by each other. The drive distribution torque Ts output by the drive distribution control section U2 is subjected to a correction based on the temperature of an oil and then input to the drive force-distributing device T, and the torque to be distributed to the left and right front wheels WFL and WFR is controlled.

Figure 6:
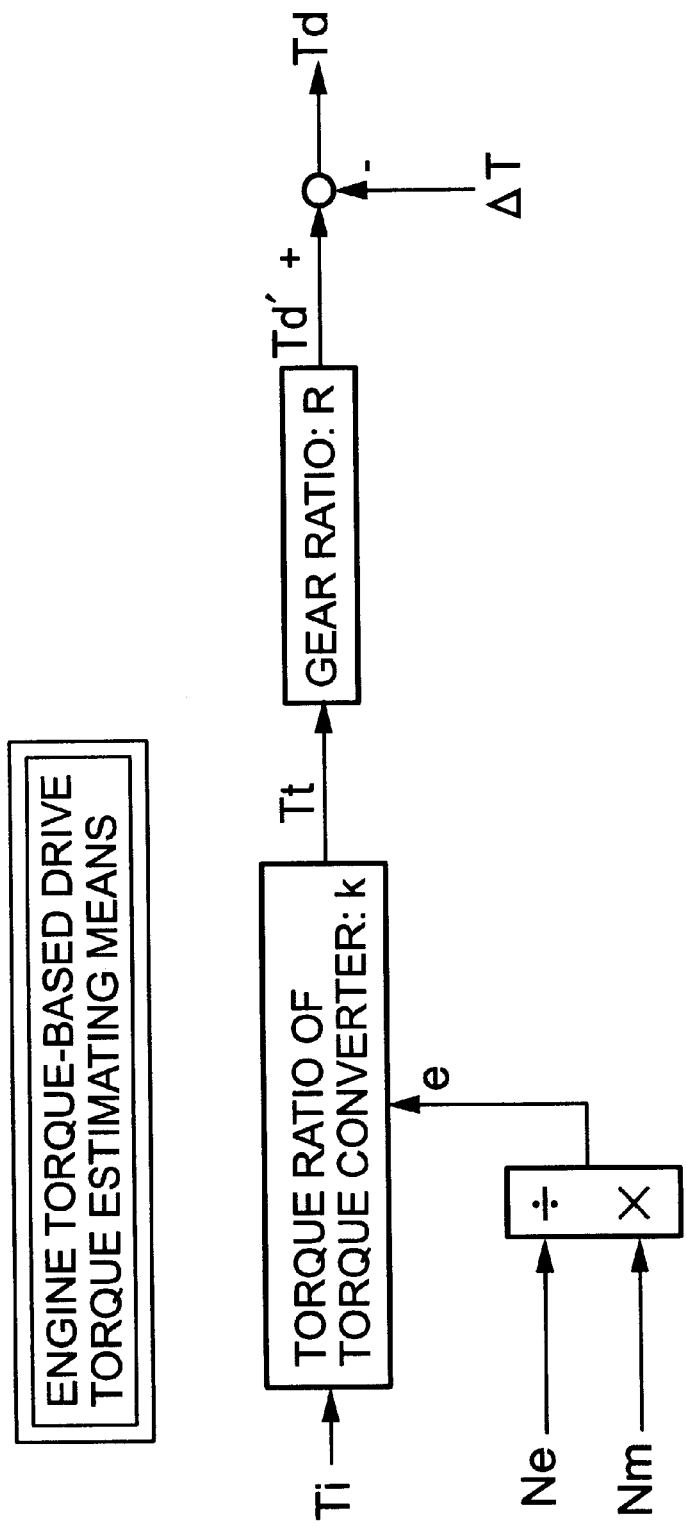

A process for estimating the drive toque Td in the drive torque estimating section U1 will be described below. Reference characters used in such process are as follows:

Ne: Engine rotational speed of the engine (rotational speed input to the torque converter)
Nm: Main shaft rotational speed (rotational speed output from the torque converter)
Ti: Torque input to the torque converter (engine torque)
Tt: Torque output from the torque converter)
Td: Drive torque
Td': Uncorrected drive torque
Ts: drive distribution torque
ΔT: Inertia drag torque in drive system
ΔT': Turning drag torque of vehicle
e: Speed ratio (e=Nm/Ne)
k: Torque ratio (k=Tt/Ti)
τ: Capacity $\{\tau=(Ti/Ne^2)\times 10^6\}$ First, the operation of the engine torque-based drive torque estimating means M1 will be described below with reference to FIG. 6.

An engine rotational speed Ne from the fuel injection ECU, an engine torque Ti and a main shaft rotational speed Nm from the automatic transmission ECU are input to the engine torque-based drive torque estimating means M1. The engine rotational speed Ne corresponds to the rotational speed input to the torque converter TC, and the main shaft rotational speed Nm corresponds to the rotational speed output from the torque converter TC. Therefore, a speed ratio e in the torque converter TC is calculated according to e=Nm/Ne. When the speed ratio e in the torque converter TC has been calculated, a torque ratio k (torque amplification rate) of the torque converter TC is determined by utilizing the speed ratio e in a map shown in FIG. 9, and a torque Ti output from the torque converter is calculated according to Tt=Ti×k by multiplying the torque Ti input to the torque converter by the torque ratio k. Then, an uncorrected drive torque Td' is calculated by multiplying the torque Tt output from the torque converter by a gear ratio R of the automatic transmission M, and an inertia drag torque ΔT in a drive system is subtracted from the uncorrected drive torque Td' to correct the uncorrected drive torque Td'. The resulting value is a final drive torque Td. The inertia drag torque ΔT in a drive system is determined by an actual measurement and is a function of a rate of variation in wheel speed (vehicle speed) V.

Figure 7:
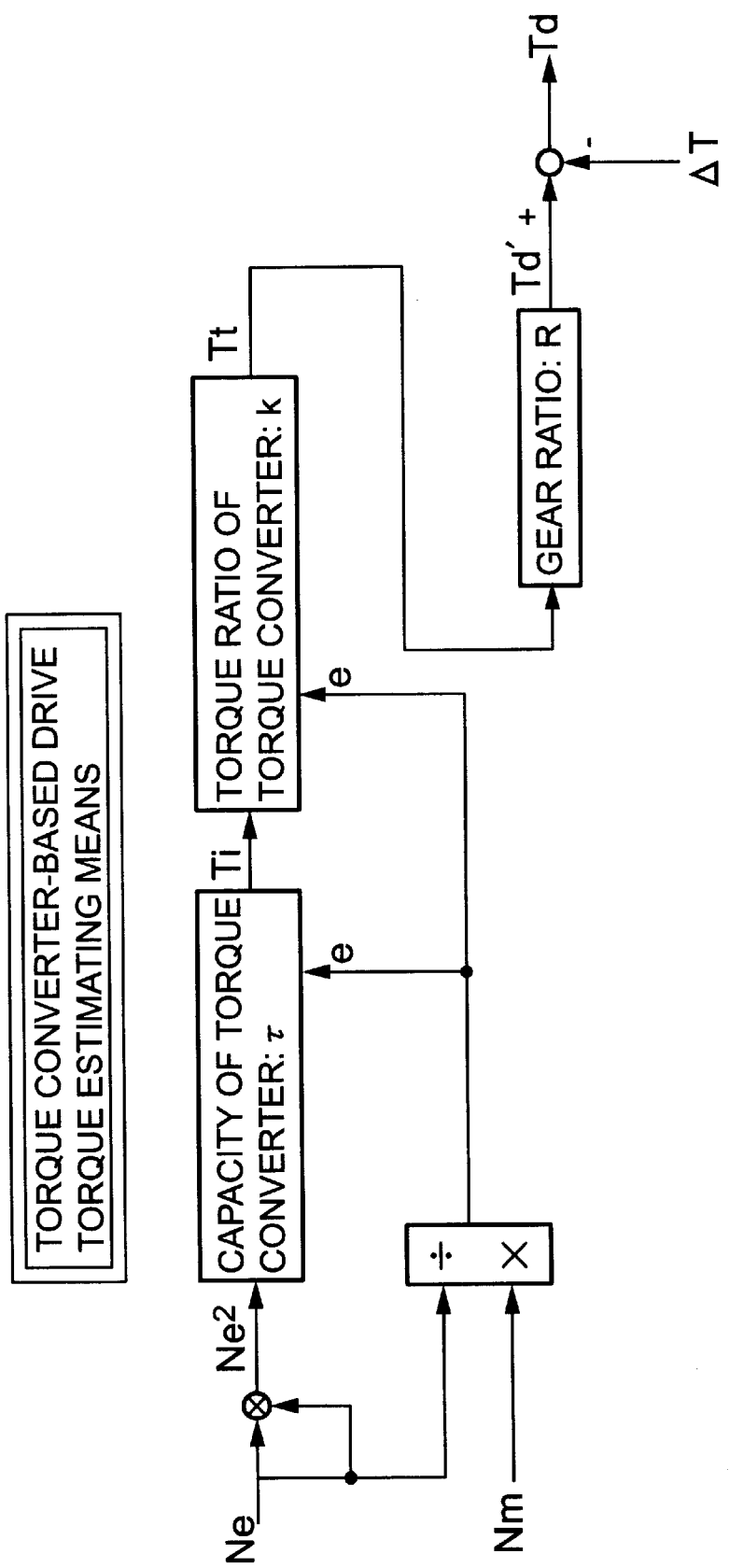

Then, the operation of the torque converter-based drive torque estimating means M2 will be described below with reference to FIG. 7.

The engine rotational speed Ne from the fuel injection ECU and the main shaft rotational speed Nm from the automatic transmission ECU are input to the torque converter-based drive torque estimating means M2. A capacity τ of the torque converter TC is determined by utilizing the speed ratio e (=Nm/Ne) in the torque converter TC calculated from the engine rotational speed Ne and the main shaft rotational speed Nm in the map shown in FIG. 9. A torque Ti input to the torque converter is calculated from $Ne^2$ and the speed ratio e according to $Ti=\tau \times Ne^2 \times 10^{-6}$. A torque ratio k of the torque converter TC is determined by utilizing the speed ratio e (=Nm/Ne) in the torque converter TC in the map shown in FIG. 9, and a torque Tt output from the torque converter is calculated by multiplying the torque Ti input to the torque converter by the torque ratio k according to Tt=Ti×k. Then, an uncorrected drive torque Td' is calculated by multiplying the torque Tt output from the torque converter by the gear ratio R of the automatic transmission M, and the inertia drag torque ΔT in the drive system is subtracted from the uncorrected drive torque Td' to correct the uncorrected drive torque Td'. The resulting value is a final drive torque Td.

A further simplified process for estimating a drive torque Td by the torque converter-based method will be described below.

Figure 9:
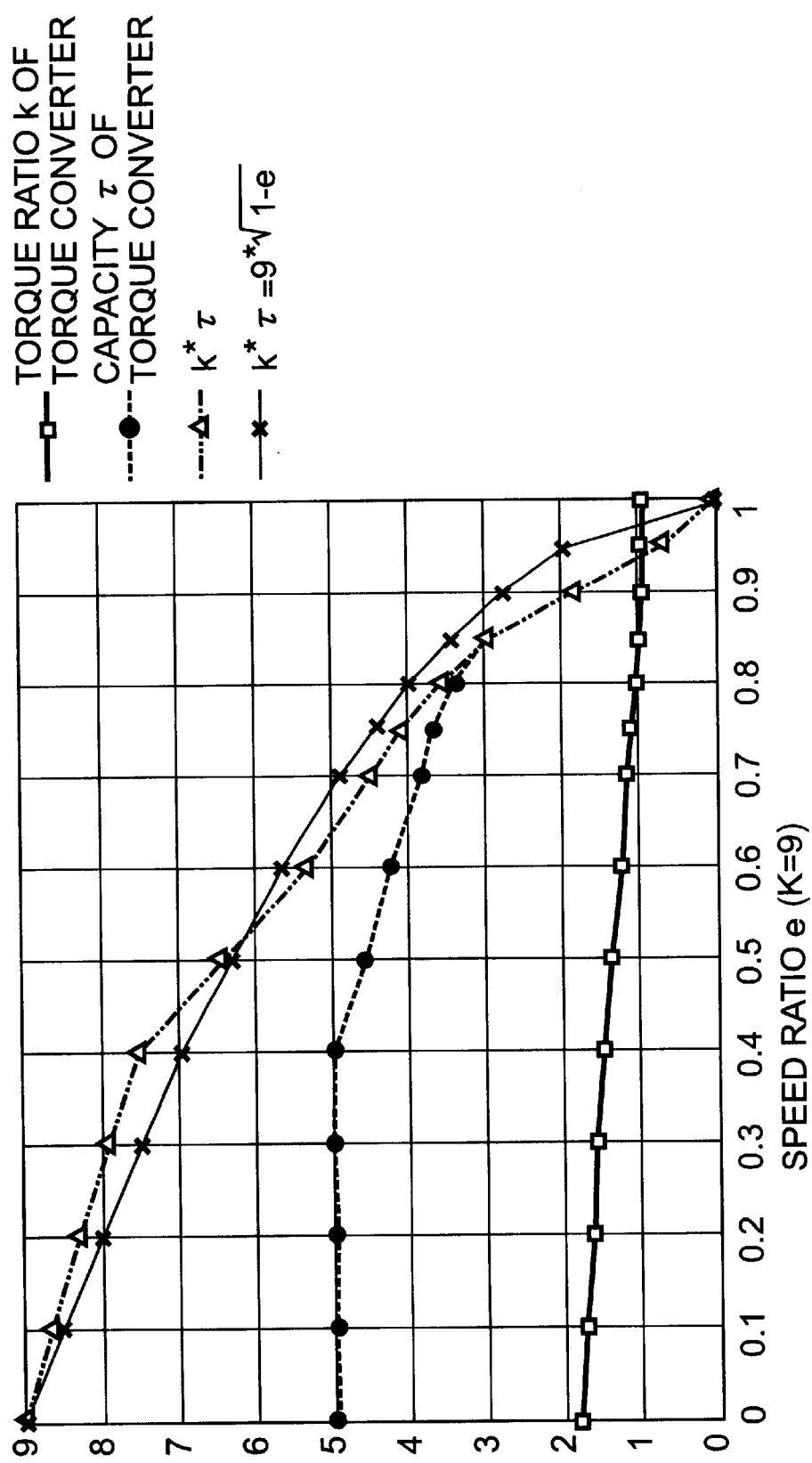

As apparent from a graph in FIG. 9, a value k×τ which is a product of the torque ratio k of the torque converter TC and the capacity τ of the torque converter TC can be approximated by $K\times(1-e)^{1/2}$, wherein K is a constant and equal to 9 in the present embodiment. If the approximation of $k\times\tau = K\times(1-e)^{1/2}$ is performed, a torque Tt output from the torque converter is provided according to the following equation:

$$Tt = k \times Ti$$
$$= k \times \tau \times Ne^2 \times 10^{-6}$$
$$= K \times (1-e)^{1/2} \times Ne^2 \times 10^{-6}$$
$$= K \times 10^{-6} \times Ne^2 \times (1 - Nm/Ne)^{1/2}$$
$$= (K \times 10^{-6}) \times Ne \times \{Ne \times (Ne - Nm)\}^{1/2}$$
$$= (8.05 \times 10^{-6}) \times Ne \times \{Ne \times (Ne - Nm)\}^{1/2}$$

The above equation indicates that the torque Tt output from the torque converter can be calculated simply from the engine rotational speed Ne and the main shaft rotational speed. The drive torque Td can be calculated by multiplying such torque Tt output from the torque converter by the gear ratio R of the automatic transmission M. The reason why the constant K is changed from 9 to 8.05 is that the correction using the inertia drag torque ΔT in the drive system is incorporated. Thus, the correction comprising the subtraction of the inertia drag torque ΔT in the drive system from the drive torque Td' before being corrected is not required.

Figure 10:
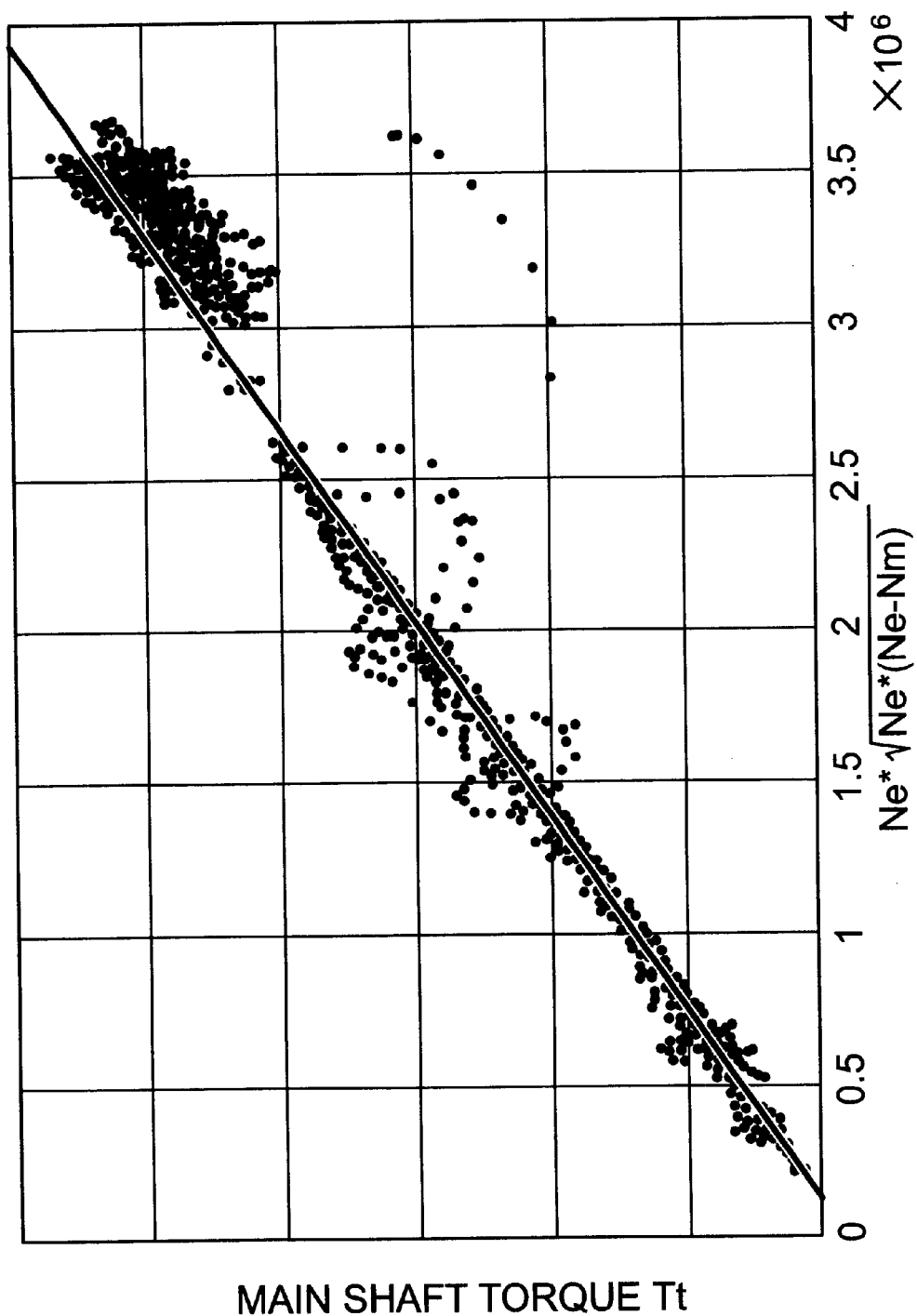

As apparent from FIG. 10, it can be seen that the torque converter-based drive torque Td estimated by the above-described simple technique coincides well with each of measured values corresponding to various vehicle speeds shown by a large number of dots.

Figure 8:
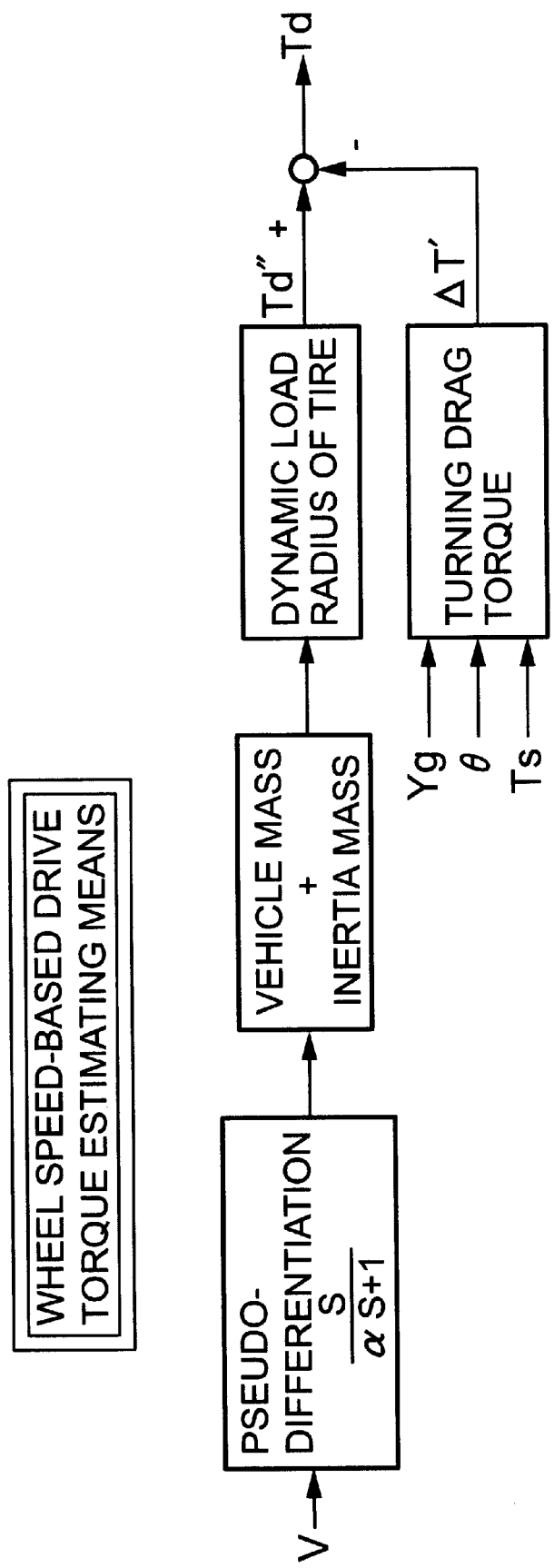

The operation of the wheel speed-based drive torque estimating means M3 will be described below with reference to FIG. 8.

In the wheel speed-based drive torque estimating means M3, a rate of variation in wheel speed, namely, a vehicle body acceleration is detected by differentiating the wheel speed (vehicle speed) V detected by the wheel speed detecting means Sc, and a drive force to be applied to the vehicle body is calculated by multiplying the vehicle body acceleration by a sum of a vehicle mass and an inertia mass. Then, an uncorrected drive torque Td' is calculated by multiplying the drive force by a dynamic load radius of a tire. A final drive torque Td is calculated by correcting the uncorrected drive torque Td' by a turning drag torque ΔT'.

A technique for calculating the turning drag torque ΔT' of the vehicle will be described below.

When the vehicle is being turned in a steady state, if a cornering force applied to the front wheels WFL and WFR is represented by Y1; a cornering force applied to the rear wheels WRL and WRR is represented by Y2; a yaw moment applied to the vehicle is represented by My; a mass of the vehicle is represented by M; a lateral acceleration applied to the vehicle is represented by Yg; a distance from the position of the gravity center of the vehicle to the front wheels WFL and WFR is represented by L1; and a distance from the position of the gravity center of the vehicle to the rear wheels WRL and WRR is represented by L2, $$M \times Yg = Y1 + Y2$$

is established from the balance of a lateral force, and $$L1 \times Y1 - L2 \times Y2 + My = 0$$

is established from the balance of a yaw moment.

When the cornering force Y2 applied to the rear wheels WRL and WRR is erased from the above two equations to determine the cornering force Y1 applied to the front wheels WFL and WFR, the following equation is provided:

$$Y1 = (L2 \times M \times Yg - My)/L$$

Wherein L (=L1+L2) represents a wheelbase.

Figure 11:
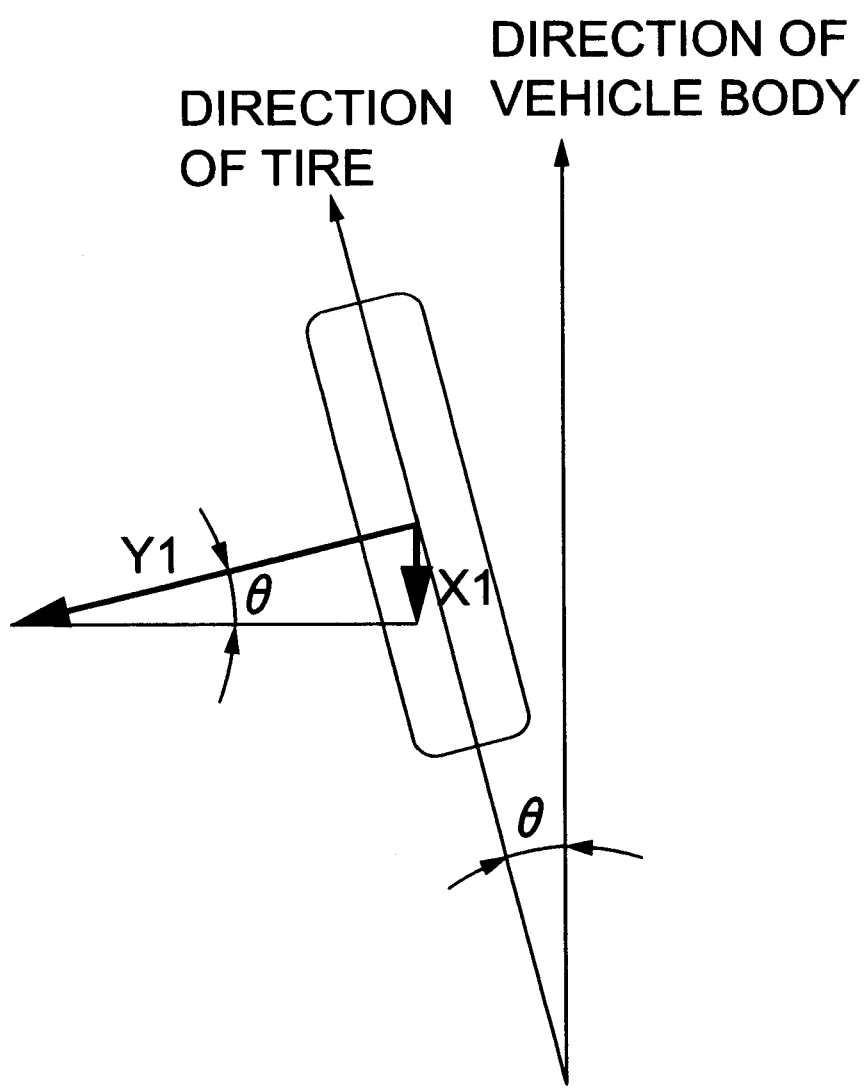

As shown in FIG. 11, if the steered angle of the wheel is represented by θ, a turning drag X1 is given according to $$X1 = Y1 \times \sin\theta = (1/L) \times (L2 \times M \times Yg - My) \times \sin\theta$$

and a turning drag torque ΔT' is given by multiplying the turning drag X1 by a dynamic load radius Rw according to the following equation:

$$\Delta T' = (Rw/L) \times (L2 \times M \times Yg - My) \times \sin\theta$$

The yaw moment My is calculated from the drive distribution torque Ts. The steered angle θ may be determined by multiplying the steering angle δ by the gear ratio of the steering system in place of being detected by the steered angle detecting means Sf.

A standard for selecting the drive torque Td in the selecting means M4 will be described below.

Figure 12:
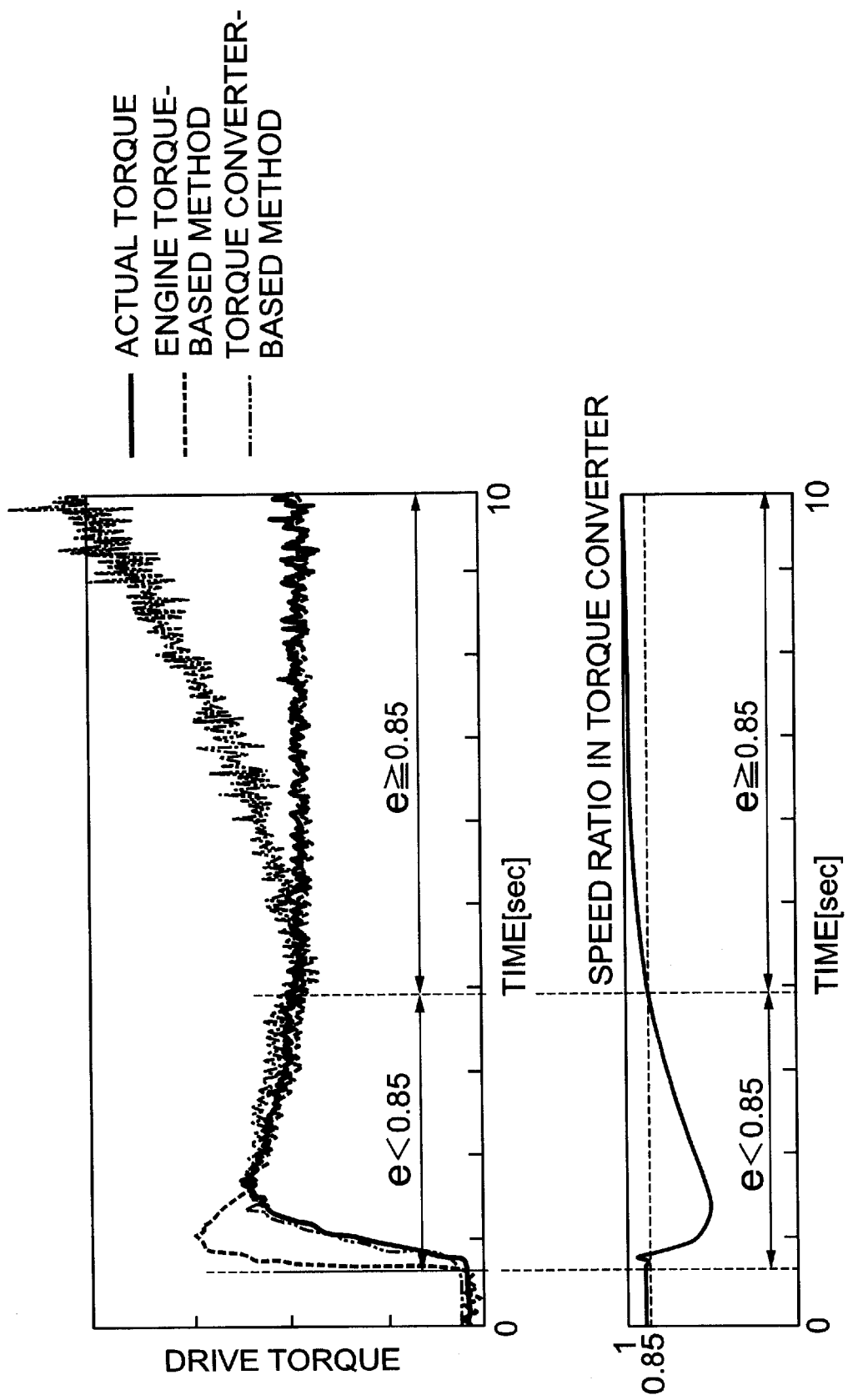

FIG. 12 shows variations in drive torque Td provided upon acceleration of the vehicle at a full throttle with the automatic transmission M fixed at a second gearshift stage by measured values (see a solid line), estimated values provided by the engine torque-based method (see a broken line) and estimated values provided by the torque converter-based method (see a dashed line). In a region in which the speed ratio e in the torque converter TC is smaller than 0.85, the estimated values provided by the torque converter-based method coincide well with the measured values, and in a region in which the speed ratio e in the torque converter TC is equal to or larger than 0.85 (including a locked-up case e=1 and an engine brake case e>1), the estimated values provided by the engine torque-based method coincide well with the measured values.

The reason why there is a larger error in the estimated values provided by the engine torque-based method in the region of the speed ratio e in the torque converter TC smaller than 0.85 is that the engine torque rises quickly, but the rising of the drive torque resulting from the transmission of the engine torque through the torque converter TC and the automatic transmission M is retarded. The reason why there is a larger error in the estimated values provided by the torque converter-based method in the region of the speed ratio e equal to or larger than 0.85 is that if the speed ratio e is increased, the variability in capacity τ of the torque converter TC is increased.

Therefore, the selecting means M4 selects the drive torque Td estimated by the engine torque-based drive torque estimating means M1 in the region of the speed ratio e equal to or larger than 0.85, and selects the drive torque Td estimated by the torque converter-based drive torque estimating means M2 in the region of the speed ratio e smaller than 0.85.

FIG. 13 shows variations in measured value of the drive torque Td (see a thick solid line), in estimated value provided by the engine torque-based method (see a broken line), in estimated value provided by the torque converter-based method (see a dashed line) and in estimated value provided by the wheel speed-based method (see a thin solid line) in a region of time including the duration of shifting of the automatic transmission M. During the shifting of the automatic transmission M, the estimated values provided by the wheel speed-based method consistently coincide well with the measured values. The estimated values provided by the wheel speed-based method coincide well with the measured values even during non-shifting, but the selecting means M4 employs the estimated value provided by the wheel speed-based method only during the shifting, because the correction is required during traveling of the vehicle up and down a slope.

As described above, when the speed ratio is equal to or larger than 0.85, the engine torque-based method is employed, and when the speed ratio is smaller than 0.85, the torque converter-based method is employed. In addition, during shifting of the automatic transmission M, the wheel speed-based method is employed. Therefore, a correct drive torque Td can be always estimated irrespective of operational states of the engine and vehicle.

Although the embodiments of the present invention have been described in detail, it will be understood that the present invention is not limited to the above-described embodiments, and various modifications in design may be made without departing from the spirit and scope of the invention defined in claims.

What is claimed is:

1. A process for estimating a drive torque in a vehicle in which a torque generated in an engine is transmitted to driven wheels through a torque converter and an automatic transmission, said process comprising the step of multiplying an estimated engine torque Ti by a torque ratio k of the torque converter to estimate a drive torque Td, when a speed ratio e in the torque converter is equal to or larger than a predetermined value, and estimating a drive torque Td from an engine rotational speed Ne and the speed ratio e in the torque converter, when the speed ratio e in the torque converter is smaller than the predetermined value.

2. A process for estimating a drive torque in a vehicle according to claim 1, wherein when the speed ratio e in the torque converter is equal to or larger than the predetermined value, the torque ratio k of the torque converter is calculated from the speed ratio e in the torque converter, and the estimated engine torque Ti is multiplied by the torque ratio k of the torque converter to estimate the drive torque Td.

3. A process for estimating a drive torque in a vehicle according to claim 1, wherein when the speed ratio e in the torque converter is smaller than the predetermined value, the torque input Ti to the torque converter is calculated from the engine rotational speed Ne and the capacity $\tau$ of the torque converter; the torque ratio k of the torque converter is calculated from the speed ratio e in the torque converter, and the torque Ti input to the torque converter is multiplied by the torque ratio k of the torque converter to estimate the drive torque Td.

4. A process for estimating a drive torque in a vehicle according to any of claims 1 to 3, wherein the predetermined value of the speed ratio e in the torque converter is 0.85.

5. A process for estimating a drive torque in a vehicle according to claim 1, wherein during shifting of the automatic transmission, the drive torque Td is estimated from a vehicle speed V.

6. A process for estimating a drive torque in a vehicle according to claim 1, 2, 3 or 5, wherein the estimated drive torque Td is used to calculate a drive distribution torque between the left and right driven wheels.

7. A process for estimating a drive torque in a vehicle according to claim 4, wherein the estimated drive torque Td is used to calculate a drive distribution torque between the left and right driven wheels.

* * * * *